Feb. 20, 1940.  A. A. FRIESTEDT  2,190,709
MEANS FOR ALIGNING VEHICLE WHEELS
Filed March 14, 1938
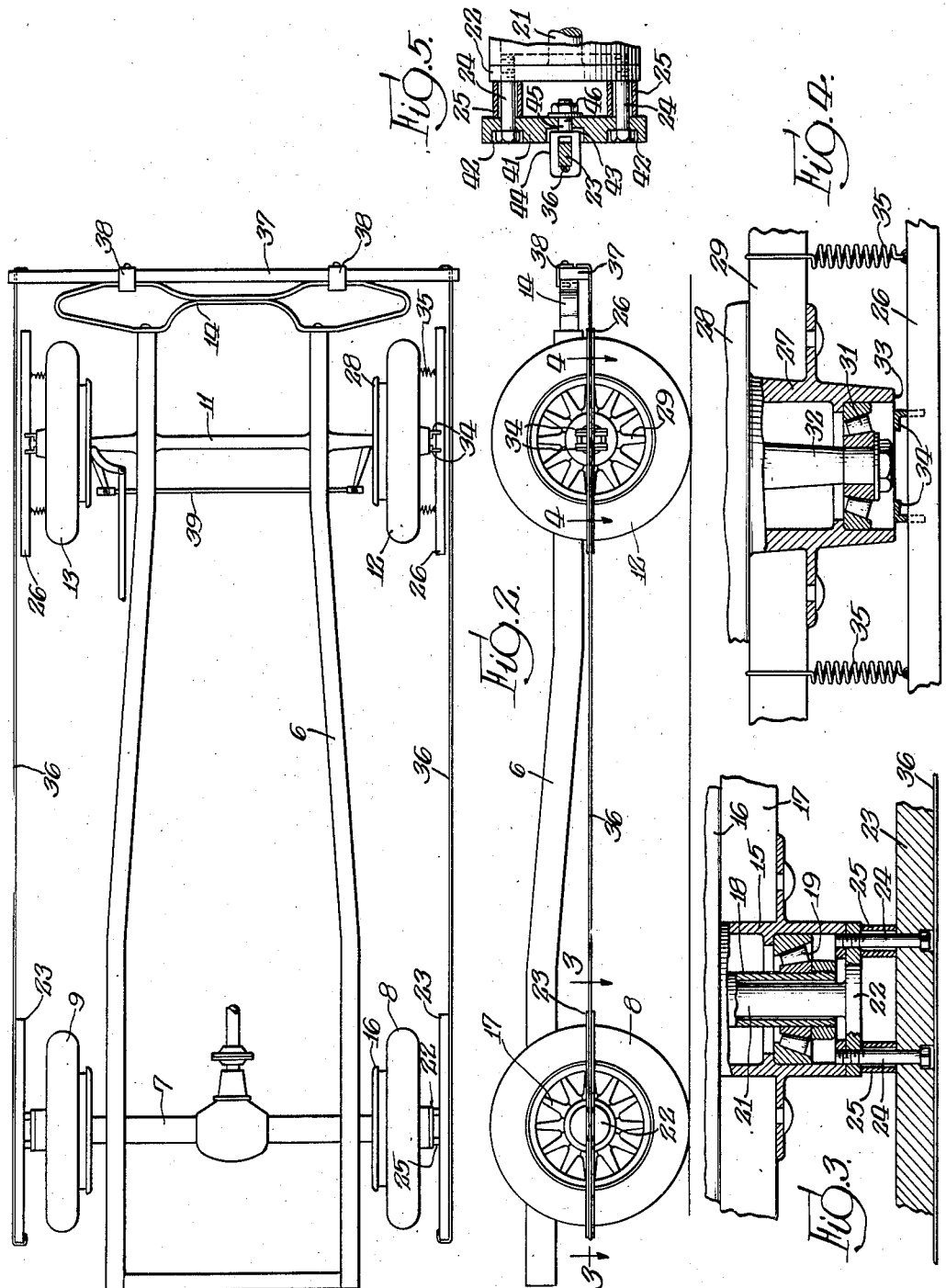
INVENTOR.
Arthur A. Friestedt,
BY Ira J. Wilson
ATTORNEY.

Patented Feb. 20, 1940

2,190,709

UNITED STATES PATENT OFFICE 2,190,709

MEANS FOR ALIGNING VEHICLE WHEELS

Arthur A. Friestedt, Chicago, Ill., assignor of one-half to Siegfried Maurer, Chicago, Ill.

Application March 14, 1938, Serial No. 195,785

10 Claims. (Cl. 33—203)

This invention pertains to the aligning of the wheels of automobiles and like vehicles and provides a novel method and means for quickly and accurately determining the relative positions of the various wheels so that if they are found to be out of alignment they may be adjusted with accuracy into true parallelism so as to run in parallel planes.

One of the purposes of my present invention is to provide a means for determining the relative positions of the wheels which will be simple and inexpensive to produce and easy to operate so that in accordance with my method any misalignment may be readily and easily detected and perfect alignment may be attained with reasonable speed and positive accuracy.

I am aware that aligning devices have heretofore been employed which relied upon measurements taken from the tires, the rims, or even from points on the wheels themselves, but by reason of the fact that the tires and rims are often not truly mounted on the wheels, or because the wheels through inaccuracy of assembly or by reason of injury do not revolve in a plane exactly perpendicular to the axis of rotation thereof, such measurements and devices for taking such measurements are not reliable and accurate aligning of the wheels cannot be attained by their use.

In accordance with my present invention, the positions of the wheels, rims and tires are entirely disregarded and reliance is placed only upon the position of planes which are known to be absolutely perpendicular to the axis of rotation of the various wheels. In accordance with my method, all errors resulting from wheel distortion or rim or tire misplacement are entirely obviated.

For the purpose of facilitating an understanding of my invention, I have illustrated on the accompanying drawings a preferred apparatus for carrying out my improved method from an inspection of which in connection with the following description the principles of my invention should be readily understood.

Referring to the drawing:

Fig. 1 is a plan view of the wheels and chassis of an automobile to which my invention is applied;

Fig. 2 is a side elevation thereof;

Fig. 3 is a fragmentary sectional view on the line 3—3 of Fig. 2;

Fig. 4 is a similar view on the line 4—4 of Fig. 2; and

Fig. 5 is a fragmentary view similar to Fig. 3 but disclosing a modified form of the invention.

Referring to the drawings more in detail, reference character 6 indicates an automobile chassis frame, 7 the rear axle housing, 8 and 9 the rear wheels, 11 the front axle, 12 and 13 the front wheels, and 14 the bumper of a standard automobile.

Each rear wheel comprises a hub 15 equipped with a brake drum 16 and the radiating spokes 17. The weight is carried through a tubular housing 18 supported in the hub upon the usual roller bearings 19, and the driving torque is applied to the hub of the wheel from a rotating, full floating driving axle 21 extending through the tubular housing 18 and provided at its outer end with a disk-shaped head 22 which is rigidly attached to the hub 15. In practice, the head 22 is machined so that its outer face is disposed in a plane exactly perpendicular to the axis of the drive shaft 21 which, of course, is coincident with the axis of rotation of the wheel.

My invention contemplates the utilization of the axis of rotation of the wheel as the basis for my method of alignment, thereby, as previously explained, eliminating all errors incident to wheel, rim, or tire distortion or displacement. In carrying out my invention, therefore, access to the outer face of head 22 which is perpendicular to the axis of rotation of the wheel is obtained by removal of the hub cap (not shown) and a straight edge 23, consisting preferably of a steel bar or rule, is fixedly attached to this head and in exact parallelism therewith. The attachment is made by means of a plurality of cap screws 24 extending through the rule and threaded into the standard openings provided in head 22. Alignment of the rule or bar in parallelism with the outer face of head 22 is insured by a pair of sleeves 25 interposed between the inner face of the rule and the outer face of the head and against which the rule is snugly drawn by threading the cap screws 24 into the head. The sleeves 25 are exactly of equal length, and their ends are ground in parallel planes perpendicular to the axes of the sleeves.

In the form of the invention disclosed in Fig. 3, the rear wheel is turned so as to dispose the rule 23 in horizontal position, as illustrated in Fig. 2, and when thus positioned the rule is not only horizontal but its outer face or edge is exactly perpendicular to the axis of rotation of the wheel. It will be understood, of course, that another identical rule 23 is similarly applied to the other rear wheel so that the two rules are disposed in horizontal position and in exact parallelism with each other, as illustrated in Fig. 1.

A similar rule 26 is now applied to each of the front wheels. The method of application, however, is slightly different owing to the difference in construction and assembly of the front wheels from the construction and assembly of the rear wheels. Referring to Fig. 4, the front wheels comprise each a hub 27 equipped with a brake drum 28 and with spokes 29, the hub being mounted through the intermediary of roller bearings 31 upon a spindle 32. The outer face 33 of each hub is, in accordance with standard practice, machined in a plane perpendicular with the axis of rotation of the wheel, and this machined surface is therefore utilized in my method as the basis for alignment of the front wheels. The rule 26 is accordingly provided with a plurality of abutments 34 projecting from the inner face of the rule 26 exactly the same distance so that the inwardly disposed faces thereof, which abut against the machined face 33 of the hub, are exactly parallel with the outer face or edge of the rule 26. The rule may be attached to the wheel in this position by any preferred means but a simple and convenient means of attachment consists of a pair of coiled springs 35 attached at one end to the inner face of the rule and provided at the opposite end with hooks adapted to be snapped over the spokes 29 of the wheel. When thus attached, the outer faces of the rules 26 are disposed in planes perpendicular to the axis of rotation of the respective front wheels.

A line 36, such as a chalk line or other string or cord of suitable strength, is attached to the rear end of each rule 23 and is extended forwardly outside the front wheels to a bar 37 adjustably supported by hooks 38 upon the bumper of the car. The forward ends of the lines 36 are attached to this bar a spaced apart distance exactly equal to the spacing of the rear ends of the lines where they pass around the rear ends of the rules 23. The bar 37 is now adjusted transversely of the chassis on the bumper 14 until the lines 36, which, of course, are exactly parallel are also parallel with and contiguous to the outer faces of rules 23. The lines 36 are disposed in proximity to but outside of the front rules 26 so that the operator may observe whether or not the outer faces of rules 26 are parallel with the lines. If they are, the front wheels are in exact parallelism with the rear wheels. The wheels may then be, by adjusting the length of the tie rod 39, adjusted so as to provide for the requisite toe in.

In Fig. 5 I have illustrated a modified form of mounting for the rear wheel rules. In the form previously described, unless the tapped holes into which the cap screws 24 are threaded happen to be disposed in horizontal position, it is necessary that the rear wheel or wheels be jacked up and turned to present the rules 23 in horizontal position. The modification of Fig. 5 obviates the necessity for thus turning the wheels by providing in effect a turn table mounting for the rule. Instead of bolting the rule directly to the head 22 by the cap screws 24, as in the previous form, a plate or turn table 41 is employed and provided with sockets or recesses 42 in which the heads of cap screws 24 are disposed so as not to project beyond the outer face of the plate. The plate is also provided with a central recess 43 to rotatably receive the inner end of a yoke 44 which has a bolt extension 45 passing through the plate and equipped with a nut 46 by which the yoke may be locked in adjusted position. The rule 23 has a snug but sliding fit in the yoke 44, the eye of which is horizontally longer than the horizontal thickness of the rule so that when nut 46 is tightened up the rule will be clamped against the outer machined face of plate 41 and therefore disposed in parallelism with head 22 and at right angles to the axis of shaft 21. Since the yoke 44 may be partially rotated before nut 46 is tightened up to thereby dispose the rule 23 exactly in horizontal position, all necessity of rotating the wheel for the purpose of horizontally positioning the rule is eliminated, and the plate 41 may be attached to the head 22 irrespective of the angular position of the stud bolt receiving openings.

In order to accommodate the line 36, the inner face of the outer end of the yoke is provided with a groove through which the line freely extends so that the position of the line is not interfered with by the yoke, and observation of its position relatively to the straight edge of the rule is not obstructed.

It should be manifest from the foregoing that with my improved method and means, absolutely accurate alignment of the wheels is attained regardless of distortion of displacement of the rims, tires or spokes. The position of the wheels is determined relatively to the axis of the rear drive shaft and the wheels must necessarily travel in exactly parallel paths regardless of distortion of the front axle or in the chassis frame. The parallel lines 36 also afford fixed bases of measurement perpendicular to the rear axle from which distortion or displacement of the chassis frame at any point throughout its length may be determined by simply measuring the distance between the line and corresponding parts of opposite frame members.

In accordance with my invention the axes of the front wheel spindles are so adjusted that when the proper toe in is attained, both spindles are in the same angular relation to the axis of the drive axle. The steering arms rigid with the spindles are consequently in the same angular relationship to the drive axle and the proper relation of the spindles is therefore maintained during turning movement in either direction. The front wheels accordingly will travel in parallel arcs about a common center when turning and without resistance or tire scrubbing. The maintenance of such a relation between the spindles is not possible unless alignment is based upon accurate relationship of the spindles to the drive axle axis.

My invention also enables accurate alignment of the wheels irrespective of distortion of the chassis frame, because the front spindles are adjusted with respect to the rear axle and without regard to the frame. In other words, even though the frame be badly bent or twisted, the front wheels can be adjusted to run parallel with the rear wheels, even though not in the same path.

While I have shown and described a preferred embodiment of the invention, the structural details illustrated may obviously be varied within considerable limits without exceeding the scope of my invention as defined in the following claims.

I claim:

1. An apparatus for aligning vehicle wheels comprising a pair of rear wheel rules each providing a straight edge, means for mounting said rules in proximity to the rear wheels so as to present said straight edges perpendicular to the axis of rotation of said wheels, means defining a straight line disposed adjacent to each of said rear rules, means for supporting said line defining means forwardly of the front wheels in parallelism with the rear rule straight edges, a pair of front wheel rules each provided with a straight edge, and means for mounting said front wheel rules in proximity to the front wheels so as to present the front rule straight edges in positions perpendicular to the axes of rotation of said front wheels.

2. An apparatus for aligning vehicle wheels comprising a pair of rear wheel rules, a pair of front wheel rules, each of said rules being provided with a straight edge, means for mounting each rule in proximity to a wheel and perpendicular to the axis of rotation of such wheel, means defining a straight line attached to the rear end of each rear wheel rule, means forwardly of the front wheels for supporting said lines in contiguous relation to the rear rule straight edges so that said lines are disposed in parallelism in proximity to the straight edges of the front rules.

3. An apparatus for aligning vehicle wheels comprising a pair of elongated rear wheel rules each presenting a straight edge, means including spacers and fastening means for mounting each rear wheel rule in proximity to a rear wheel so as to present the straight edge thereof perpendicular to the axis of rotation of such wheel, a pair of elongated front wheel rules each presenting a straight edge, means including spacers and fastening means for mounting each front wheel rule in proximity to a front wheel so as to present the straight edge of each rule perpendicular to the axis of rotation of the adjacent wheel, a cord attached to the rear end of each rear wheel rule and extending forwardly alongside the vehicle, and means adjustably mounted upon the front end of the vehicle for supporting said cords parallel with each other and with the straight edges of said rear rules and in proximity to the straight edges of the front rules.

4. An apparatus for aligning vehicle wheels comprising an elongated rule providing a straight edge, means for mounting said rule perpendicular to the axis of rotation of a vehicle wheel, said mounting means including a plate, spacers, and fastening means for fixedly mounting said plate perpendicular to the axis of rotation of the wheel, a yoke adapted to adjustably support a rule, said yoke being rotatably adjustable relatively to said plate, and means for locking said yoke and rule in adjusted position on said plate.

5. An apparatus for aligning vehicle wheels comprising a pair of rear wheel rules each providing a straight edge, means for mounting said rules at the opposite ends of the rear wheel axle of an automobile whereby the straight edges of said rules are disposed perpendicular to the longitudinal axis of said rear axle, a pair of front wheel rules each providing a straight edge, means for mounting said front wheel rules at the ends of the front wheel spindles and whereby said rules are positioned to dispose the straight edges thereof perpendicular to their respective front wheel spindles, and means for maintaining a taut cord parallel with the straight edge of each rear rule and in proximity to but spaced from the respective straight edges of said front wheel rules.

6. An apparatus for aligning vehicle wheels comprising four rules each providing a straight edge of substantial length, means for mounting two of said rules with their longitudinal axes intersecting and perpendicular to the rotative axis of the rear axle of an automobile, said rules being mounted respectively at opposite sides of an automobile and positioned to dispose the straight edges thereof in substantially horizontal position, means for mounting the remaining two rules at opposite sides of the vehicle with their longitudinal axes intersecting and perpendicular to the respective axes of the front wheel spindles, said front wheel rules being also positioned with their straight edges disposed in a substantially horizontal plane, a pair of cords mounted rearwardly of the rear axle and disposed parallel with the straight edges of the rear rules, and means forwardly of the front wheel spindles for holding said cords taut substantially in the horizontal plane of the front wheel straight edges.

7. A wheel aligning device comprising a pair of rear rules each presenting a straight edge, means for mounting said rules to present said straight edges perpendicular to the axis of rotation of the rear axle of an automobile and spaced from the ends of said axle, a pair of front rules, means for mounting said front rules perpendicular to the axes of the front wheel spindles of an automobile and spaced from the ends of said spindles, the distance between the straight edges of the front rules being less than the distance between the straight edges of the rear rules, a pair of cords secured rearwardly of the rear axle and extending forwardly parallel with the straight edges of the rear rules to points forwardly of the front rules, said cords extending in parallel relation and spaced outwardly from the straight edges of the front rules, and means forwardly of the front rules for holding said cords taut in said parallel relation.

8. An apparatus for aligning vehicle wheels comprising a rule for providing a straight edge, means for mounting said rule at the end of a rear wheel axle of a vehicle whereby the straight edge of said rule is disposed at right angles to the axis of rotation of said rear axle, means defining a straight line extending forwardly from said rule, parallel with said straight edge to a point forwardly of the axis of a front wheel spindle of said vehicle, and means comprising a part disposed perpendicular to the axis of said front wheel spindle for cooperating with said line defining means to indicate the angular relation between the axis of said rear wheel axle and the axis of said front wheel spindle.

9. A wheel aligning device comprising a rule presenting a straight edge, means for mounting said rule at the end of a rear wheel axle of a vehicle so as to present said straight edge at a right angle to the axis of rotation of said axle, means defining a straight line extending forwardly from said rule parallel with said straight edge to a point forwardly of the axis of a front wheel spindle of said vehicle, and means positioned in predetermined relation to said front wheel axis and extending from said front wheel in proximity to said line defining means, whereby the angular relation of said front wheel axis to said rear axle axis may be determined.

10. A device for aligning vehicle wheels comprising means for defining a straight line between the axes of rotation of a rear wheel and a front wheel of a vehicle, a device for insuring the positioning of said line defining means at right angles to the rotational axis of said rear wheel, and a device including a part positioned at right angles to the rotational axis of said front wheel for indicating the angular relation between said front and rear wheel axes.

ARTHUR A. FRIESTEDT.